United States Patent
Fukazawa

(10) Patent No.: US 11,117,230 B2
(45) Date of Patent: Sep. 14, 2021

(54) FLEXIBLE RING FITTING DEVICE

(71) Applicant: HONDA MOTOR CO., LTD., Tokyo (JP)

(72) Inventor: Kinya Fukazawa, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 261 days.

(21) Appl. No.: 16/272,041

(22) Filed: Feb. 11, 2019

(65) Prior Publication Data

US 2019/0247966 A1     Aug. 15, 2019

(30) Foreign Application Priority Data

Feb. 13, 2018   (JP) .............................. JP2018-023516

(51) Int. Cl.
*B23P 19/08*     (2006.01)
(52) U.S. Cl.
CPC ......... *B23P 19/084* (2013.01); *B23P 2700/50* (2013.01)
(58) Field of Classification Search
CPC .................................................... B23P 19/084
USPC ........................................................... 29/235
See application file for complete search history.

(56) References Cited

U.S. PATENT DOCUMENTS 5,392,505 A * 2/1995 Harada ................. B23P 19/084
29/235

FOREIGN PATENT DOCUMENTS

| JP | H02-011384 | | 3/1990 | |
|----|------------|---|--------|---|
| JP | H04-048895 U | | 11/1992 | |
| JP | H05-116039 A | | 5/1993 | |
| JP | H06-50097 Y2 | | 12/1994 | |
| JP | 11-114731 | * | 4/1999 | ............. B23P 19/02 |
| JP | H11-114731 | | 4/1999 | |

OTHER PUBLICATIONS

Japanese Office Action dated Jul. 23, 2019, 2 pages.

* cited by examiner

*Primary Examiner* — Lee D Wilson
*Assistant Examiner* — Jonathan G Santiago Martinez
(74) *Attorney, Agent, or Firm* — Rankin, Hill & Clark LLP

(57) ABSTRACT

In a flexible ring fitting device 1, a flexible ring disposition mechanism includes at least two ring support members 411 and 412 disposed relative to each other and movable so as to be separated from each other. Notches 4113 and 4123 recessed in a direction in which the two ring support members 411 and 412 are separated from each other are formed along surfaces 4114 and 4124 of the two relative ring support members 411 and 412 in the relative surfaces 4114 and 4124 of the two ring support members 411 and 412. A flexible ring R is fitted into an annular groove G of a workpiece W by a workpiece disposition mechanism moving in one direction along with the workpiece W.

6 Claims, 3 Drawing Sheets

FLEXIBLE RING FITTING DEVICE

This application is based on and claims the benefit of priority from Japanese Patent Application No. 2018-023516, filed on 13 Feb. 2018, the content of which is incorporated herein by reference.

BACKGROUND OF THE INVENTION

Field of the Invention

The present invention relates to a flexible ring fitting device.

Related Art

Known in the related art are devices fitting a flexible O-ring into a groove of a columnar workpiece that has an outer peripheral surface where the groove (annular groove) is formed (see, for example, Patent Documents 1 and 2). In the devices, a rod-shaped member rotating along the outer peripheral surface of the workpiece is rotated while the O-ring is pressed against the workpiece. The O-ring is fitted into the groove of the workpiece as a result.

Also known is a device provided with a holding mechanism for holding an O-ring in a direction perpendicular to a groove of a workpiece with the workpiece disposed such that the axial direction of the workpiece coincides with an upward-downward direction (see, for example, Patent Document 3). In this device, the workpiece is moved along a guide groove to the O-ring and the O-ring is fitted into the groove by a roller pressed by the workpiece and moving to the right and left of the workpiece.

Patent Document 1: Japanese Examined Patent Application Publication No. H02-11384
Patent Document 2: Japanese Unexamined Patent Application, Publication No. H11-114731
Patent Document 3: Japanese Utility Model Application Publication No. H04-48895

SUMMARY OF THE INVENTION

In the devices according to the related art that are described in Patent Documents 1 and 2, the rod-shaped member (arm portion) rotates about the axial center of the workpiece having a predetermined diameter. Accordingly, no O-ring can be fitted into a groove of a workpiece having a diameter different from the predetermined diameter. In other words, the devices according to the related art are configured to be capable of fitting O-rings simply with respect to workpieces having one type of diameter.

Besides, even in a case where O-rings are fitted with respect to the workpieces having one type of diameter by means of the devices according to the related art described in Patent Documents 1 and 2, it is not easy to fit the O-ring into the workpiece groove without a positional relationship in which the axial center of the rotary shaft of the arm portion and the axial center of the workpiece coincide with each other.

Besides, in the device according to the related art described in Patent Document 3, the roller performs no symmetrical operation with respect to the workpiece unless the workpiece is moved along a rail and the O-ring first reaches the groove near the center of the workpiece. Then, it is not easy to uniformly fit the O-ring into the workpiece groove. Besides, in the device according to the related art, the O-ring can be fitted only into workpieces having one type of diameter that corresponds to the width of the rail, and thus it is impossible to respond to workpieces having various diameters.

An object of the present invention is to provide a flexible ring fitting device capable of fitting a flexible ring in response to workpieces having different diameters and capable of uniformly fitting an O-ring into a workpiece groove.

In order to achieve the above object, the present invention provides a flexible ring fitting device (such as a flexible ring fitting device 1 to be described later) fitting a flexible ring (such as an O-ring R to be described later) into an annular groove (such as a groove G to be described later) of a workpiece (such as a workpiece W to be described later) having the annular groove in an outer periphery of the workpiece. The flexible ring fitting device includes a workpiece disposition mechanism (such as a workpiece placement table 17 to be described later) for disposing the workpiece such that the groove of the workpiece and the flexible ring are relative to each other and a flexible ring disposition mechanism (such as a ring support member 40, a first ring support member 411, a second ring support member 412, and an O-ring supply rail 30 to be described later) installed adjacent to the workpiece disposition mechanism. The workpiece disposition mechanism is movable in one direction (such as a downward direction to be described later) or the other direction (such as an upward direction to be described later) as a direction opposite to the one direction. The flexible ring disposition mechanism includes at least two ring support members (such as the first ring support member 411 and the second ring support member 412 to be described later) disposed relative to each other and movable so as to be separated from each other and notches (such as notches 4113 and 4123 to be described later) recessed in a direction in which the two ring support members are separated from each other are formed along surfaces of the two relative ring support members in the relative surfaces (such as surfaces 4114 and 4124 to be described later) of the two ring support members. The flexible ring is fitted into the annular groove of the workpiece by the workpiece disposition mechanism moving in the one direction along with the workpiece.

According to the present invention, the two ring support members are pushed apart so as to be separated from each other by the workpiece being pushed down. Then, the flexible ring can be fitted into the annular groove of the workpiece by the parts forming the notches of the two ring support members. Accordingly, the distance by which the two ring support members are separated from each other, that is, the width by which the two ring support members are spread can be flexibly changed in accordance with the diameter of the workpiece. Accordingly, it is possible to fit the flexible ring into the annular groove of the workpiece by flexibly responding to workpieces having various diameters.

Even in a case where the axial center of the workpiece placed on the workpiece disposition mechanism is slightly misaligned without coinciding with the respective facing surfaces of the two ring support members abutting against each other, the two ring support members move so as to be separated from each other with a positional relationship in which the axial center of the workpiece is the middle when the workpiece is pushed down. Accordingly, it is possible to fit the flexible ring into the groove of the workpiece.

The workpiece disposition mechanism includes a disposition surface (such as a workpiece placement surface 172 to be described later) for placing the workpiece at a position further in the other direction than a thickness of the flexible ring with respect to a flexible ring disposition surface (such as upper surfaces 4111 and 4121 to be described later) of the flexible ring disposition mechanism for placing the flexible ring. As a result, the workpiece can be stably disposed on the workpiece disposition mechanism. The workpiece stably disposed as described above is allowed to abut against the flexible ring by being pushed down. Subsequently, the flexible ring abutting against the workpiece can be pressed against the two ring support members. As a result, it is possible to stabilize fitting of the flexible ring into the groove of the workpiece.

A first elastic body (such as a spring 15 to be described later) is provided on the one direction side of the workpiece disposition mechanism and the first elastic body presses the workpiece disposition mechanism in the other direction. As a result, it is possible to return the workpiece disposition mechanism to an initial position with the urging force of the first elastic body after the workpiece is pushed down so that the O-ring is fitted into the annular groove of the workpiece.

A second elastic body (such as a spring 423 to be described later) is provided on a side opposite to the relative surface side of the ring support member and the second elastic body urges and presses the two ring support members toward each other. As a result, it is possible to return the two ring support members to a state of mutually abutting with the urging force of the second elastic body after the workpiece is pushed down along with the workpiece disposition mechanism so that the flexible ring is fitted into the annular groove of the workpiece.

A depth of the notch has a part (such as right end portion parts of the notches 4113 and 4123 to be described later) gradually increasing toward the workpiece disposition mechanism. Accordingly, when the workpiece is pushed down so that the flexible ring is fitted into the annular groove of the workpiece and the flexible ring abuts against the upper surfaces of the two ring support members and presses and pushes apart the two ring support members, the flexible ring gradually enters the notches so as to approach the longitudinal middle portion of the workpiece at the parts where the depths of the notches gradually increase toward the workpiece disposition mechanism. Accordingly, a load on the flexible ring can be mitigated.

The flexible ring fitting device includes a unidirectional moving mechanism (such as a workpiece abutting portion 71 to be described later) for moving the workpiece disposition mechanism in the one direction. Accordingly, it is possible to move the workpiece from a position above the flexible ring placed on the flexible ring disposition mechanism to a side below the two ring support members.

According to the present invention, it is possible to provide a flexible ring fitting device capable of fitting a flexible ring in response to workpieces having different diameters and capable of uniformly fitting an O-ring into a workpiece groove.

DETAILED DESCRIPTION OF THE INVENTION

Figure 1:
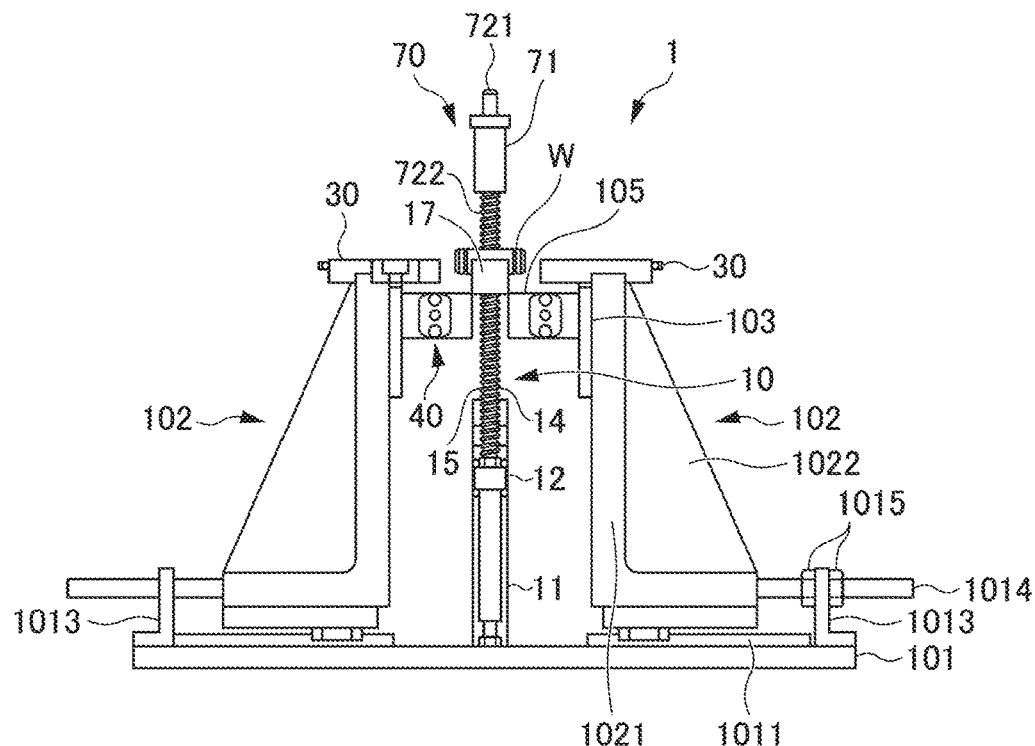
FIG. 1 is a front view illustrating a flexible ring fitting device according to an embodiment of the present invention.

An embodiment of the present invention will be described in detail with reference to accompanying drawings. A flexible ring fitting device 1 is used so that a rubber-based O-ring R, which is a flexible ring, is fitted into a groove G (annular groove G). The groove G extends in the circumferential direction of a workpiece W and goes around. Each groove G is formed in the outer peripheral surface of a longitudinal end portion of the workpiece W. The workpiece W, which has a cylindrical shape, is a pipe member (pipe) interconnecting cases such as a crankcase and a differential case in a vehicle. FIG. 1 is a front view illustrating the flexible ring fitting device 1.

Figure 2:
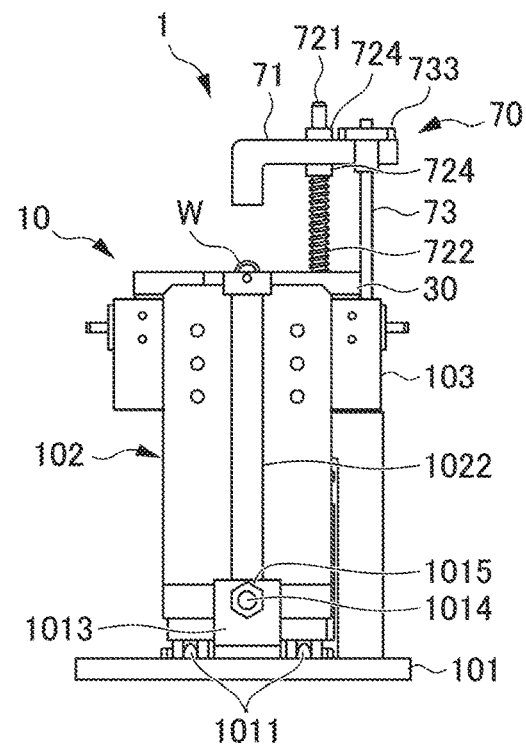
FIG. 2 is a side view illustrating the flexible ring fitting device according to an embodiment of the present invention.
Figure 3:
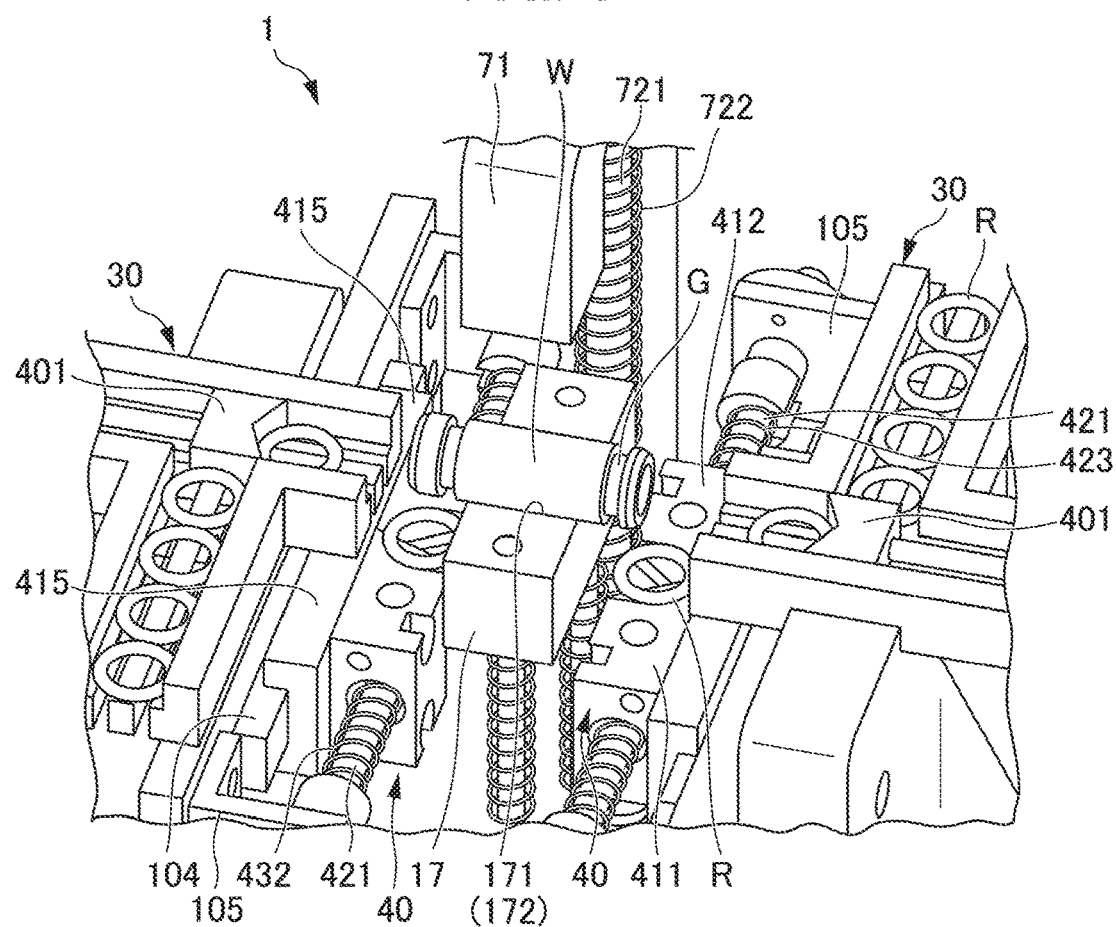
FIG. 3 is an enlarged perspective view illustrating the flexible ring fitting device according to an embodiment of the present invention.

In the following description, the direction in which a pair of support side walls 102 (described later) is interconnected (leftward-rightward direction in FIG. 1) is defined as a leftward-rightward direction. In addition, the direction in which a first ring support member 411 (described later) is opened (direction from the back surface toward the surface of the page in FIG. 1) is defined as a forward direction and the direction in which a second ring support member 412 (described later) is opened (direction from the surface toward the back surface of the page in FIG. 1) is defined as a rearward direction. In addition, the direction from a base plate 101 toward the support side wall 102 (upward direction in FIG. 1) is defined as an upward direction and the direction that is opposite to the upward direction is defined as a downward direction. The flexible ring fitting device 1 has a substantially symmetrical configuration. Accordingly, the following description will focus on one side (right side) and description of the other side will be omitted. FIG. 2 is a side view illustrating the flexible ring fitting device 1. FIG. 3 is an enlarged perspective view illustrating the flexible ring fitting device 1.

As illustrated in FIG. 1, the flexible ring fitting device 1 is provided with a workpiece disposition portion 10, an O-ring supply rail 30, and a ring support member 40, which are disposed on the rectangular flat plate-shaped base plate 101.

More specifically, the pair of support side walls 102 facing each other is disposed on the base plate 101. The support side wall 102 has a support wall portion 1021 and a reinforcing plate portion 1022. When viewed from the front, the support wall portion 1021 has a plate shape bent in an L shape. As illustrated in FIG. 1, the reinforcing plate portion 1022 has a triangular plate shape when viewed from the front. As illustrated in FIG. 2, the reinforcing plate portion 1022 is connected by integral molding to the middle portion of the support side wall 102 in the forward-rearward direction.

The support side wall 102 is supported by a rail 1011 so as to be movable in the leftward-rightward direction by being guided by the rail 1011 provided on the base plate 101 and extending in the leftward-rightward direction. End plate portions 1013 protruding in the upward direction are fixed to the base plate 101 in both end portions of the base plate 101 in the leftward-rightward direction. A female screw-threaded through hole is formed in the end plate portion 1013. A shaft 1014 having a male screw-threaded peripheral surface passes through and is screwed in the through hole.

In this configuration, the support side wall 102 moves in the leftward-rightward direction as a result of rotation of the shaft 1014. Nuts 1015 are provided on the left and right of the through hole through which the shaft 1014 passes. Each of the nuts 1015 is screwed to the shaft 1014. The end plate portion 1013 is pinched by the pair of nuts 1015. As a result, the shaft 1014 is fixed so as not to rotate and the support side wall 102 is fixed so as to be immovable with respect to the base plate 101.

A rectangular plate member 103 is fixed to the upper end portion of the support side wall 102 with a positional relationship in which the longitudinal direction of the plate member 103 coincides with the forward-rearward direction. The plate member 103 is provided with a guide rail 104 (see FIG. 3) and an end plate portion 105. The guide rail 104 is fixed to the plate member 103 with a positional relationship in which the longitudinal direction of the guide rail 104 coincides with the forward-rearward direction. The end plate portions 105 are respectively provided in both longitudinal end portions of the plate member 103. The end plate portion 105 of the plate member 103 that is on the right side protrudes in the direction toward the plate member 103 on the left side and the end plate portion 105 of the plate member 103 that is on the left side protrudes in the direction toward the plate member 103 on the right side.

A through hole is formed in each of the pair of end plate portions 105. One end portion of a spring support shaft 421 (see FIG. 3) passes through the through hole. The other end portions of the spring support shaft 421 are fixed to the first ring support member 411 (described later) and the second ring support member 412 (described later) constituting the ring support member 40, respectively. A spring 423 is annularly mounted on the spring support shaft 421. A compression spring constitutes the spring 423. One end portion of the spring 423 abuts against the end plate portion 105. The other end portions of the springs 423 abut against the first ring support member 411 (described later) and the second ring support member 412 (described later), respectively. The spring 423 urges the first ring support member 411 and the second ring support member 412 toward each other.

Guided base portions 415 are respectively fixed to the first ring support member 411 and the second ring support member 412. The guided base portion 415 is engaged with the guide rail 104 and movable along the guide rail 104. Accordingly, the first ring support member 411 and the second ring support member 412 are configured to be guided by the guide rail 104 against the urging force of the spring 423 and movable in the forward-rearward direction (front or back direction in FIG. 3). In other words, the first ring support member 411 and the second ring support member 412 are configured to be capable of moving toward or away from each other against the urging force of the spring 423.

Figure 4:
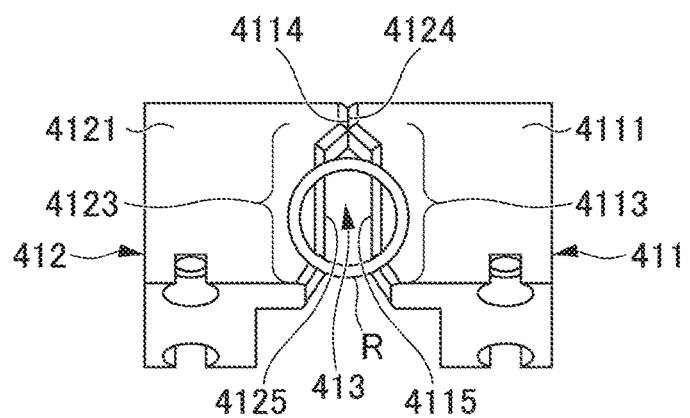
FIG. 4 is an enlarged perspective view illustrating a ring support member of the flexible ring fitting device according to an embodiment of the present invention.

As illustrated in FIG. 4, the first ring support member 411 and the second ring support member 412 are disposed relative to each other and have a symmetrical shape in the forward-rearward direction. FIG. 4 is an enlarged perspective view illustrating the ring support member 40 of the flexible ring fitting device 1.

The first ring support member 411 and the second ring support member 412 are moved in the forward-rearward direction and approach and abut against each other by the urging force of the spring 423 (see FIG. 3). More specifically, the rear end portion of the first ring support member 411 (left end portion on the back side in FIG. 4) and the front end portion of the second ring support member 412 (right end portion on the back side in FIG. 4) abut against each other. During this abutting, the O-ring R supplied from the O-ring supply rail 30 is placed on upper surfaces 4111 and 4121 of the first ring support member 411 and the second ring support member 412.

Notches 4113 and 4123 are formed in a relative surface 4114 and the relative surface 4121 of the first ring support member 411 and the second ring support member 412, respectively. The notches 4113 and 4123 are formed so as to be recessed in the direction in which the first ring support member 411 and the second ring support member 412 are separated from each other and along the surface 4114 and a surface 4124 of the relative first ring support member 411 and second ring support member 412. Specifically, the direction in which the first ring support member 411 and the second ring support member 412 are separated from each other is the forward direction (rightward direction in FIG. 4) in the first ring support member 411 and the rearward direction (leftward direction in FIG. 4) in the second ring support member 412.

At the right end portion (upper end portion in FIG. 4) parts of the notches 4113 and 4123, the depths of the recesses of the notches 4113 and 4123 (spreads of the notches 4113 and 4123 in the leftward-rightward direction in FIG. 4) in the forward-rearward direction (leftward-rightward direction in FIG. 4) gradually increase from the end portion in the leftward-rightward direction toward the direction toward the middle where a workpiece placement table 17 (described later) is disposed (downward direction in FIG. 4). The part that is closer to the middle (part closer to the downward direction in FIG. 4) has a constant recess depth. At the part that is closest to the middle (downward-direction end portion in FIG. 4), the depth of the recess gradually increases again.

When the first ring support member 411 and the second ring support member 412 abut against each other, each of the opening parts of a groove 413 formed by combination between the notch 4113 of the first ring support member 411 and the notch 4123 of the second ring support member 412, that is, each of the boundary part between a side surface 4115 of the first ring support member 411 forming the groove 413 and the upper surface 4111 of the first ring support member 411 and the boundary part between a side surface 4125 of the second ring support member 412 forming the groove 413 and the upper surface 4121 of the second ring support member 412 has an R-chamfered portion.

As illustrated in FIG. 3, the O-ring supply rail 30 that is on the right side has a groove shape open in the upward direction and extends in the rightward direction from the ring support member 40. An O-ring moving portion 401 is provided in the end portion of the O-ring supply rail 30 in the rightward direction. The O-ring moving portion 401 is driven by a drive device such as a cylinder (not illustrated) and slides in the groove of the rail. The halfway part of the O-ring supply rail 30 that is on the right side branches and extends in the rearward direction. The O-ring moving portion 401 pushes out, in the leftward direction, the O-ring R supplied from the part of the O-ring supply rail 30 extending in the rearward direction and supplies the O-ring R from the O-ring supply rail 30 to the first ring support member 411 and the second ring support member 412 of the ring support member 40 on the right side. As illustrated in FIG. 4, the O-ring moving portion 401 places the O-ring R on the ring support member 40 such that the O-ring R straddles the upper surface 4111 of the first ring support member 411 and the upper surface 4121 of the second ring support member 412.

As in the case of the O-ring supply rail 30 on the right side, the O-ring supply rail 30 that is on the left side has a groove shape open in the upward direction. The O-ring supply rail 30 on the left side extends in the leftward direction from the ring support member 40. The O-ring moving portion 401 is provided in the end portion of the O-ring supply rail 30 in the leftward direction. The O-ring moving portion 401 is driven by a drive device such as a cylinder (not illustrated) and slides in the groove of the rail. The halfway part of the O-ring supply rail 30 that is on the left side branches and extends in the forward direction. The O-ring moving portion 401 pushes out, in the rightward direction, the O-ring R supplied from the part of the O-ring supply rail 30 extending in the forward direction and supplies the O-ring R from the O-ring supply rail 30 to the ring support member 40 on the left side. The O-ring moving portion 401 places the O-ring R on the ring support member 40 such that the O-ring R straddles the upper surface 4111 of the first ring support member 411 and the upper surface 4121 of the second ring support member 412.

The workpiece disposition portion 10 and a workpiece moving portion 70 (see FIG. 1) are provided adjacent to the first ring support member 411 and the second ring support member 412 between the first ring support member 411 and the second ring support member 412 and the first ring support member 411 and the second ring support member 412 respectively provided on the pair of support side walls 102. As illustrated in FIG. 1, the workpiece disposition portion 10 is provided with a leg portion 11, an intermediate portion 12, a spring support shaft 14, a spring 15, and the workpiece placement table 17. A prism constitutes the leg portion 11. The leg portion 11 is fixed to the base plate 101 and extends in the upward direction from the base plate 101 with a positional relationship of separation in the forward-rearward direction.

The intermediate portion 12 is provided with a positional relationship in which the longitudinal direction of the intermediate portion 12 coincides with the forward-rearward direction. The upper end portion of the leg portion 11 is fixed to the front end portion of the intermediate portion 12. The rear portion of the intermediate portion 12 extends in the downward direction and is connected to the base plate 101. A pair of through holes penetrating the intermediate portion 12 in the upward-downward direction is formed in the intermediate portion 12. The lower end portion of the spring support shaft 14 passes through each of the through holes.

A compression spring constitutes the spring 15. The spring 15 is annularly mounted on each spring support shaft 14. The upper end portions of the spring support shaft 14 are fixed to the front end portion and the rear end portion of the workpiece placement table 17, respectively. The lower end portion of the spring 15 abuts against the intermediate portion 12. The upper end portion of the spring 15 abuts against the workpiece placement table 17. As a result, the spring 15 urges the workpiece placement table 17 in the upward direction. Accordingly, the workpiece placement table 17 is configured to be guided by the intermediate portion 12 and the spring support shaft 14 against the urging force of the spring 15 and movable in the upward-downward direction.

As illustrated in FIG. 3, the workpiece placement table 17 has a rectangular parallelepiped shape. A semi-columnar workpiece engagement recessed portion 171 is formed in the longitudinal middle portion of the upper surface of the workpiece placement table 17. The middle portion of the workpiece W that is cylindrical can be engaged with the workpiece engagement recessed portion 171. The part of the upper surface of the workpiece placement table 17 that forms the workpiece engagement recessed portion 171 constitutes a workpiece placement surface 172. When the workpiece placement table 17 is at an initial position where the workpiece placement table 17 is not moved by the workpiece moving portion 70, the workpiece placement surface 172 is at a position (high position) above the axial thickness of the O-ring R placed on the upper surface 4111 of the first ring support member 411 and the second ring support member 412 as illustrated in FIG. 4 with respect to the upper surfaces 4111 and 4121 of the first ring support member 411 and the second ring support member 412.

As illustrated in the drawings including FIG. 2, the workpiece moving portion 70 is provided with a workpiece abutting portion 71, a spring support shaft 721, and a drive shaft 73. The workpiece abutting portion 71 has an L shape when viewed from one side. The lower end portion of the workpiece abutting portion 71 is capable of abutting against the upper side of the workpiece W placed on the workpiece placement table 17. A through hole is formed in the middle portion of the workpiece abutting portion 71 in the forward-rearward direction. The spring support shaft 721 passes through the through hole. The upper end portion of the spring support shaft 721 is fixed to the workpiece abutting portion 71 by a nut 724. The lower end portion of the spring support shaft 721 is fixed to the intermediate portion 12.

A spring 722 is annularly mounted on the spring support shaft 721. A compression spring constitutes the spring 722. The upper end portion of the spring 722 abuts against the workpiece abutting portion 71 via the nut 724. The lower end portion of the spring 722 abuts against the intermediate portion 12. As a result, the spring 722 urges the workpiece abutting portion 71 in the upward direction. Accordingly, the workpiece abutting portion 71 is configured to be guided by the spring support shaft 721 against the urging force of the spring 722 and movable in the upward-downward direction.

The upper end portion of the drive shaft 73 passes through the through hole that is formed in the rear portion of the workpiece abutting portion 71 and is fixed to the workpiece abutting portion 71 by a fixing metal fitting 733. The lower end portion of the drive shaft 73 is connected to an output shaft of a drive unit constituted by a cylinder (not illustrated) or the like. In this configuration, the workpiece abutting portion 71 moves up and down integrally with the drive shaft 73 by the drive unit (not illustrated) being driven.

Figure 5:
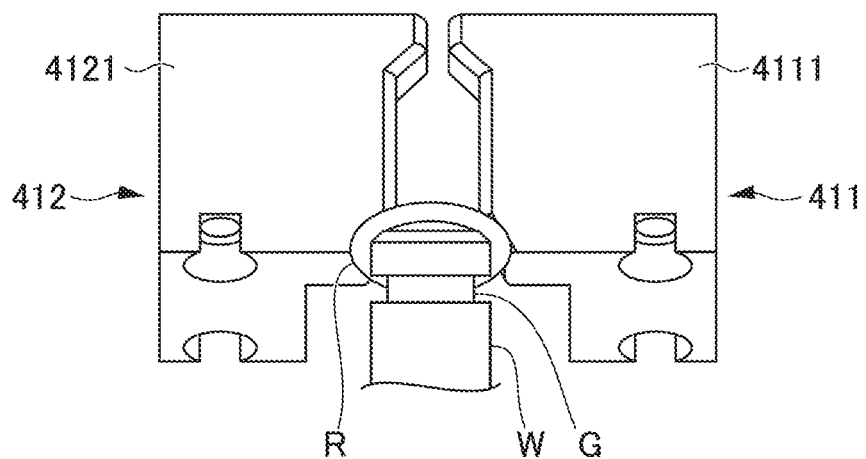
FIG. 5 is an enlarged plan view illustrating a state where an O-ring placed on the ring support member of the flexible ring fitting device according to an embodiment of the present invention is fitted in a workpiece groove.

Next, an operation for fitting the O-ring R into the groove G of the workpiece W with the flexible ring fitting device 1 configured as described above will be described. FIG. 5 is an enlarged plan view illustrating a state where the O-ring placed on the ring support member of the flexible ring fitting device 1 is fitted in the groove of the workpiece. First, the O-ring R is pushed and moved by the O-ring moving portion 401 in the O-ring supply rail 30. As a result, the O-ring R is supplied from the O-ring supply rail 30 to the ring support member 40. Then, as illustrated in FIG. 4, the O-ring R is placed on the ring support member 40 so as to straddle the upper surface 4111 of the first ring support member 411 and the upper surface 4121 of the second ring support member 412.

Next, the workpiece abutting portion 71 of the workpiece moving portion 70 is lowered by the drive unit (not illustrated) being driven. The lower end portion of the front end portion of the workpiece abutting portion 71 abuts against the workpiece W. Then, the workpiece abutting portion 71 is further lowered. As a result, the workpiece W is pushed down along with the workpiece placement table 17. As a result, the end portion of the workpiece W where the groove G is formed abuts against the O-ring R, which is placed on the upper surface 4111 of the first ring support member 411 and the upper surface 4121 of the second ring support member 412, as illustrated in FIG. 5 and is pushed down in the downward direction. At this time, the first ring support member 411 and the second ring support member 412 can be easily moved away from each other against the urging force of the spring 423. Accordingly, the first ring support member 411 and the second ring support member 412 are separated from each other by the O-ring R being pushed down in the downward direction.

When the first ring support member 411 and the second ring support member 412 are separated from each other as described above, the O-ring R is pushed down in the downward direction along the chamfered portions of the first ring support member 411 and the second ring support member 412, approaches the longitudinal middle of the workpiece W (downward direction in FIG. 5) so as to follow the groove G of the workpiece W, and is drawn into the groove G. When the workpiece W reaches the lower sides of the first ring support member 411 and the second ring support member 412 through the space between the first ring support member 411 and the second ring support member 412 separated from each other, the fitting of the O-ring R into the groove G of the workpiece W is completed.

The present embodiment has the following effects. In the present embodiment, the workpiece placement table 17 as a workpiece disposition mechanism and the ring support member 40 are provided. The workpiece placement table 17 disposes the workpiece W such that the groove G of the workpiece W and the O-ring R as a flexible ring are relative to each other. The ring support member 40 is installed adjacent to the workpiece placement table 17. The workpiece placement table 17 is movable in the downward direction or the upward direction. The ring support member 40 has at least two ring support members (first ring support member 411 and second ring support member 412) disposed relative to each other and movable so as to be separated from each other. The notches 4113 and 4123 are formed in the relative surfaces of the first ring support member 411 and the second ring support member 412. The notches 4113 and 4123 are recessed in the direction in which the first ring support member 411 and the second ring support member 412 are separated from each other. The notches 4113 and 4123 are formed along the surfaces 4114 and 4124 of the relative first ring support member 411 and second ring support member 412.

As a result, the first ring support member 411 and the second ring support member 412 are pushed apart so as to be separated from each other by the workpiece abutting portion 71 moving in the downward direction along with the workpiece W and pushing down the workpiece W. Then, the O-ring R can be fitted into the groove G of the workpiece W by the parts forming the notches 4113 and 4123 of the first ring support member 411 and the second ring support member 412. Accordingly, the distance by which the first ring support member 411 and the second ring support member 412 are separated from each other, that is, the width by which the first ring support member 411 and the second ring support member 412 are spread can be flexibly changed in accordance with the diameter of the workpiece W. Accordingly, it is possible to fit the O-ring R into the groove G of the workpiece W by flexibly responding to the workpieces W having various diameters.

Even in a case where the axial center of the workpiece W placed on the workpiece placement table 17 is slightly misaligned without coinciding with the respective facing surfaces (surfaces 4114 and 4124) of the first ring support member 411 and the second ring support member 412 abutting against each other, the first ring support member 411 and the second ring support member 412 move so as to be separated from each other with a positional relationship in which the axial center of the workpiece W is the middle when the workpiece W is pushed down by the workpiece abutting portion 71. Accordingly, it is possible to fit the O-ring R into the groove G of the workpiece W.

The workpiece placement table 17 as a workpiece disposition mechanism is provided with the upper surfaces 4111 and 4121, which are disposition surfaces for placing the workpiece W, at a position above the thickness of the O-ring R with respect to the workpiece placement surface 172 of the workpiece placement table 17 for placing the O-ring R as a flexible ring. As a result, the workpiece W can be stably disposed on the workpiece placement table 17. The workpiece W stably disposed as described above is allowed to abut against the O-ring R by being pushed down by the workpiece abutting portion 71. Subsequently, the O-ring R abutting against the workpiece W can be pressed against the upper surface 4121 of the second ring support member 412 and the first ring support member 411. As a result, it is possible to stabilize fitting of the O-ring R into the groove G of the workpiece W.

The spring 15 is provided on the downward-direction side of the workpiece placement table 17. The spring 15 presses the workpiece placement table 17 in the upward direction. As a result, it is possible to return the workpiece placement table 17 to the initial position with the urging force of the spring 15 after the workpiece W is pushed down along with the workpiece placement table 17 by the workpiece abutting portion 71 so that the O-ring R is fitted into the groove G of the workpiece W.

The spring 423 is provided on the side that is opposite to the relative facing surfaces (surfaces 4114 and 4124) of the first ring support member 411 and the second ring support member 412. The spring 423 urges and presses the first ring support member 411 and the second ring support member 412 toward each other. As a result, it is possible to return the first ring support member 411 and the second ring support member 412 to a state of mutually abutting with the urging force of the spring 423 after the workpiece W is pushed down along with the workpiece placement table 17 by the workpiece abutting portion 71 so that the O-ring R is fitted into the groove G of the workpiece W.

The depths of the notches 4113 and 4123 in the forward-rearward direction have parts gradually increasing toward the workpiece placement table 17. Accordingly, when the workpiece W is pushed down along with the workpiece placement table 17 by the workpiece abutting portion 71 so that the O-ring R is fitted into the groove G of the workpiece W and the O-ring R abuts against the upper surface 4111 of the first ring support member 411 and the upper surface 4121 of the second ring support member 412 and presses and pushes apart the first ring support member 411 and the second ring support member 412 in the downward direction, the O-ring R gradually enters the notches 4113 and 4123 so as to approach the longitudinal middle portion of the workpiece W at the parts where the depths of the notches 4113 and 4123 in the forward-rearward direction gradually increase toward the workpiece placement table 17. Accordingly, a load on the O-ring R can be mitigated.

Also provided is the workpiece abutting portion 71 moving the workpiece placement table 17 as a workpiece disposition mechanism in the downward direction. Accordingly, it is possible to move the workpiece W from a position above the O-ring R placed on the ring support member 40 to a side below the first ring support member 411 and the second ring support member 412.

The present invention is not limited to the above-described embodiment. Modifications, improvements, and the like within the scope of achieving the object of the present invention are included in the present invention. For example, the configuration of each part of the flexible ring fitting device is not limited to the configuration of each part of the flexible ring fitting device 1 according to the present embodiment. In other words, each configuration such as the workpiece disposition mechanism, the flexible ring disposition mechanism, the ring support member, the notch, the flexible ring disposition surface, the disposition surface, the first elastic body, the second elastic body, and the unidirectional moving mechanism is not limited to each configuration such as the workpiece placement table 17, the O-ring supply rail 30, the first ring support member 411, the second ring support member 412, the notches 4113 and 4123, the upper surfaces 4111 and 4121 of the first ring support member 411 and the second ring support member 412, the workpiece placement surface 172, the spring 15, the spring 423, and the workpiece abutting portion 71 according to the present embodiment. Accordingly, for example, the present invention is not limited to the configuration in which the depths of the notches 4113 and 4123 in the forward-rearward direction (leftward-rightward direction in FIG. 4) remain unchanged in the upward-downward direction with the exception of the chamfered portions as illustrated in FIG. 4. For example, the depths of the notches 4113 and 4123 in the forward-rearward direction (leftward-rightward direction in FIG. 4) may decrease downwards in the notches 4113 and 4123 (such that the first ring support member 411 and the second ring support member 412 approach each other).

Although the O-ring R is fitted into the groove G of the workpiece W by the workpiece W being moved in the downward direction along with the workpiece placement table 17, the direction of the movement is not limited to the downward direction. When the workpiece placement table 17 is at the initial position where the workpiece placement table 17 is not moved by the workpiece moving portion 70, the workpiece placement surface 172 is at a position (high position) above the axial thickness of the O-ring R placed on the upper surfaces 4111 and 4121 of the first ring support member 411 and the second ring support member 412 with respect to the upper surfaces 4111 and 4121 of the first ring support member 411 and the second ring support member 412. The present invention is not limited to this configuration. For example, when the workpiece placement table 17 is at the initial position, the workpiece placement surface 172 may have a positional relationship in which the workpiece placement surface 172 is at the same height as (flush with) the upper surface 4111 of the first ring support member 411 and the upper surfaces 4111 and 4121 of the second ring support member 412.

EXPLANATION OF REFERENCE NUMERALS

1 FLEXIBLE RING FITTING DEVICE
15 SPRING
17 WORKPIECE PLACEMENT TABLE
30 O-RING SUPPLY RAIL
40 RING SUPPORT MEMBER
71 WORKPIECE ABUTTING PORTION
172 WORKPIECE PLACEMENT SURFACE
411 FIRST RING SUPPORT MEMBER
412 SECOND RING SUPPORT MEMBER
423 SPRING
4111, 4121 UPPER SURFACE
4113, 4123 NOTCH
4114, 4124 SURFACE
G GROOVE
R O-RING
W WORKPIECE

What is claimed is:

1. A flexible ring fitting device fitting a flexible ring into an annular groove of a workpiece having the annular groove in an outer periphery of the workpiece, the flexible ring fitting device comprising:
   a workpiece placement table adapted to have the workpiece disposed thereon such that the groove of the workpiece and the flexible ring are relative to each other; and
   a flexible ring disposition mechanism installed adjacent to the workpiece disposition mechanism, wherein
   the workpiece placement table is movable in two directions, wherein the two directions comprise a first direction and a second direction, the second direction being opposite to the first direction,
   the flexible ring disposition mechanism includes at least two ring support members and notches formed along surfaces of the at least two ring support members, wherein the at least two ring support members are disposed relative to each other and are movable so as to be separated from each other, and the notches are recessed in a direction in which the at least two ring support members are movable to be separated from each other and are formed along relative surfaces of the at least two ring support members, and
   the flexible ring is fitted into the annular groove of the workpiece by the workpiece placement table moving in the first direction along with the workpiece.

2. The flexible ring fitting device according to claim 1, wherein the workpiece placement table includes a disposition surface for placing the workpiece, the flexible ring disposition mechanism includes a flexible ring disposition surface for placing the flexible ring, and the disposition surface of the workpiece placement table is provided such that the workpiece placed thereon is at a position further from the flexible ring disposition surface in the second direction than a thickness of the flexible ring.

3. The flexible ring fitting device according to claim 1, wherein a first spring is provided on the first direction side of the workpiece placement table and the first spring presses the workpiece placement table in the second direction.

4. The flexible ring fitting device according to claim 1, wherein a second spring is provided on a side opposite to the relative surface side of the ring support member and the second spring urges and presses the two ring support members toward each other.

5. The flexible ring fitting device according to claim 1, wherein a depth of each of the notches has a part gradually increasing toward the workpiece disposition mechanism.

6. The flexible ring fitting device according to claim 1, further comprising a workpiece abutting portion configured to abut against the workpiece placed on the workpiece placement table to move the workpiece placement table in the first direction.

* * * * *